United States Patent
Sauler et al.

(10) Patent No.: US 6,805,097 B2
(45) Date of Patent: Oct. 19, 2004

(54) METHOD FOR REGULATING KNOCKING

(75) Inventors: Juergen Sauler, Stuttgart (DE); Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/398,541

(22) PCT Filed: Sep. 28, 2001

(86) PCT No.: PCT/DE01/03743

§ 371 (c)(1),
(2), (4) Date: Oct. 2, 2003

(87) PCT Pub. No.: WO02/31356

PCT Pub. Date: Apr. 18, 2002

(65) Prior Publication Data

US 2004/0045527 A1 Mar. 11, 2004

(30) Foreign Application Priority Data

Oct. 7, 2000 (DE) .......................................... 100 49 653

(51) Int. Cl.$^7$ .................................................. F02P 5/00
(52) U.S. Cl. .............................. 123/406.21; 123/406.16

(56) References Cited

U.S. PATENT DOCUMENTS

| 5,027,775 | A | | 7/1991 | Iwata |
| 5,038,735 | A | * | 8/1991 | Hosoya et al. ......... 123/406.21 |
| 5,144,929 | A | * | 9/1992 | Hosoya et al. ......... 123/406.21 |
| 6,062,199 | A | | 5/2000 | Unland et al. |
| 6,588,401 | B2 | * | 7/2003 | Sauler et al. .......... 123/406.21 |
| 6,662,781 | B1 | * | 12/2003 | Torno et al. ........... 123/406.16 |

FOREIGN PATENT DOCUMENTS

| DE | 195 47 167 | 6/1997 |
| JP | 58 135 365 | 8/1983 |

* cited by examiner

*Primary Examiner*—Mahmoud Gimie
(74) *Attorney, Agent, or Firm*—Kenyon & Kenyon

(57) ABSTRACT

A method for controlling knocking in multi-cylinder internal combustion engines in KC emergency operation and at activated guide-cylinder function are provided by which a torque loss is able to be avoided at low application expenditure and the functionality desired by the guide-cylinder function is maintained even in KC emergency operation. In KC emergency operation and when the guide-cylinder function is activated, cylinder pairs are formed from the cylinders operating in each case at a 360° offset. Each twin pair having at least one cylinder to be guided is assigned at least one of the available guide cylinders, so that the ignition timing retard of the cylinder pair to be guided is based on the ignition timing retard of the associated guide cylinder. Only when the number of available guide cylinders is insufficient will a safety retard timing be triggered, in which an ignition angle is adjusted which has been predefined for all cylinders.

3 Claims, 1 Drawing Sheet

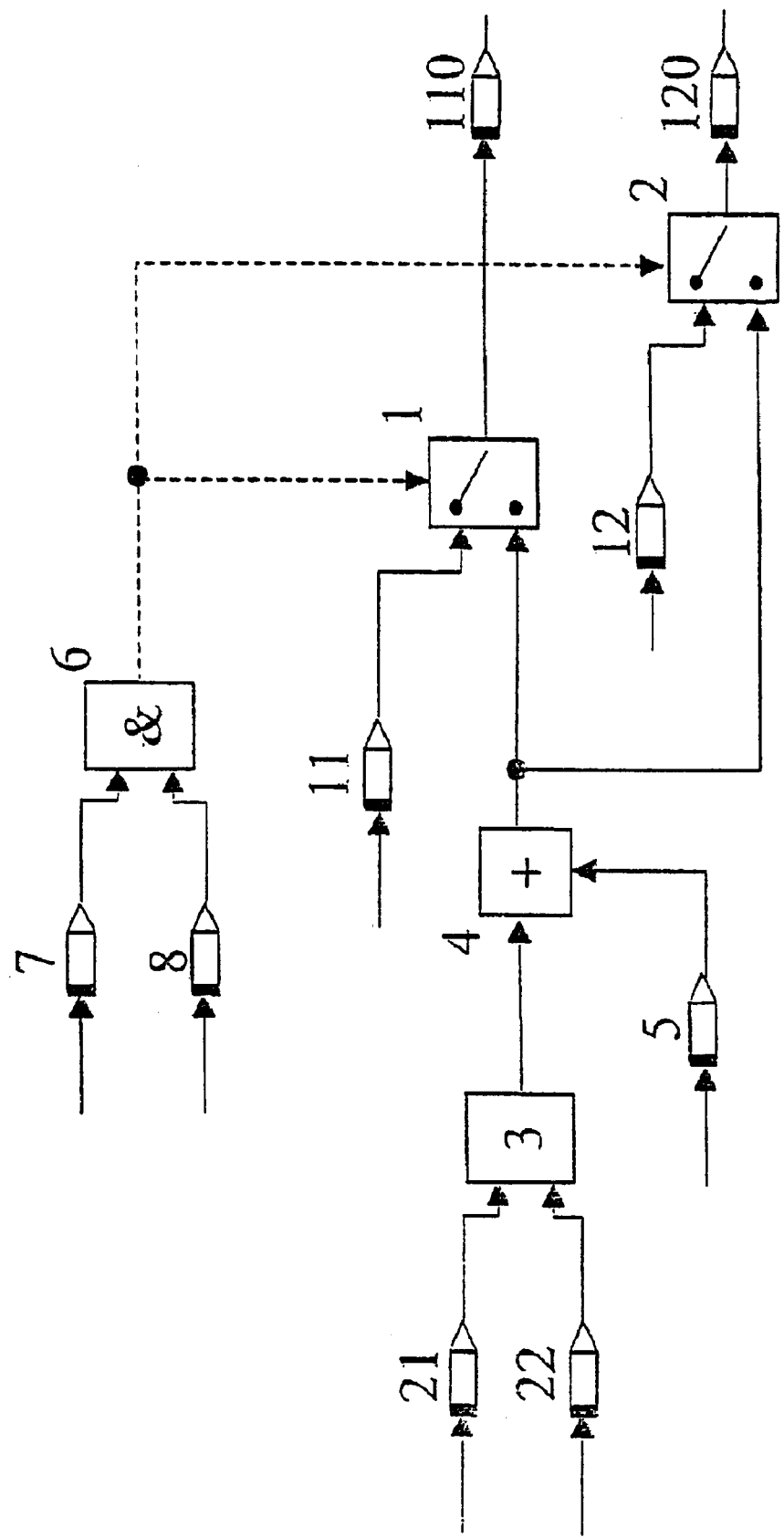

METHOD FOR REGULATING KNOCKING

FIELD OF THE INVENTION

The present invention relates to a method for controlling knocking in multi-cylinder internal combustion engines having 2n cylinders, at least one of the cylinders being able to function as a guide cylinder for a cylinder designated to be the guided cylinder upon activation of a guide-cylinder function, having a cylinder counter, at least one knock sensor and an evaluation unit for evaluating the knock-sensor signals from the individual cylinders.

The evaluation of the knock-sensor signals is usually performed with the aid of individual knock-detection characteristics for each cylinder.

BACKGROUND INFORMATION

Knocking is understood as an uncontrolled form of combustion, which may lead to engine damage. For this reason, the ignition angle is normally always selected with a safety distance to the knock limit. On the other hand, it is known that an internal combustion engine should be operated as close as possible to the knock limit in order to achieve optimum torque. Thus, keeping the ignition angle at a safety distance to the knock limit results an increased fuel consumption. The knock limit depends on a variety of factors during the operation of an internal combustion engine, such as fuel quality, engine state and environmental conditions. In order to be able to select the safety distance as small as possible, that is, to be able to bring the ignition angle as close as possible to the instantaneous knock limit, the respective instantaneous knock limit must first be determined in each case. It is standard practice to use knock sensors for this purpose, such as structure-borne noise sensors or combustion chamber pressure-sensors.

The knock-sensor signal is individually evaluated for each cylinder. Assigning the instantaneous knock-sensor signal to a particular cylinder, which is required for this purpose, is performed with the aid of the cylinder counter within the framework of a phase detection in which the states of the individual cylinders during operation of the internal combustion engines are detected. Under certain conditions, if the phase detector fails, it no longer possible to determine whether the knock-sensor signal which is to be assigned to the cylinder corresponding to the cylinder-counter reading is being evaluated or that of the cylinder running at a 360 degree offset. This case is called knock-control (KC) emergency operation.

In practice, given KC emergency operation, the knock-detection threshold having the most sensitive setting of all cylinders is selected and used as the basis of the ignition-timing control for all cylinders. The selection of the corresponding knock-detection characteristic must then be checked whenever the knock-detection threshold has been changed, so that undetected knocks and, thus, engine damage may be avoided.

Independently of KC emergency operation, it may occur that, starting with a specific rotational speed, a reliable knock detection is no longer possible for individual cylinders. In this case, the affected cylinder is designated as a cylinder to be guided, and the so-called guide-cylinder function is activated. In this way, one or even a plurality of guide cylinders is/are assigned to the cylinder to be guided. The cylinder to be guided is then operated at the ignition timing retard of the guide cylinder(s) and, if appropriate, has an additional offset applied. If it is not possible to assign a guide cylinder to an affected cylinder, the latest ignition angle of the remaining cylinders is used for this cylinder. In this case, the ignition angle may have an additional offset applied as well.

In practice, it may occur that the guide-cylinder function is activated in KC emergency operation. In this case, the so-called safety-ignition retard is triggered in which an ignition angle is set which has been predefined for all cylinders. The resultant setting of the ignition angles to retard causes a high loss in torque.

SUMMARY OF THE INVENTION

The present invention provides a method for knock control in KC emergency operation and activated guide-cylinder function which make it possible to avoid torque loss and to maintain the functionality desired by the guide-cylinder function even in KC emergency operation, while keeping the application cost low.

According to the present invention, this is achieved in that in KC-emergency operation and at activated guide-cylinder function
- cylinder pairs are formed from those cylinders running in each instance at an offset of 360 degrees;
- each twin pair having at least one cylinder to be guided being assigned at least one of the available guide cylinders, so that the ignition timing retard of the associated guide cylinder forms the basis of the ignition timing retard of the cylinder pair to be guided;
- and a safety retard timing in which an ignition angle is set that has been predefined for all cylinders is triggered only when no sufficient number of guide cylinders is available.

According to the present invention, a knock control or an ignition timing control in KC emergency operation and a knock control or ignition-timing control with guide-cylinder function are interlinked in such a way that the ignition timing control is performed as a function of the state of the respective cylinder. This is because the knock control according to the present invention takes into account both whether a cylinder is affected by the unavailability of phase detection and also whether a reliable knock detection is still possible for a cylinder at the given rotational speed. For this purpose, according to the present invention, the cylinders of the internal combustion engines are combined into cylinder pairs. The ignition angles of the cylinders of a cylinder pair to be guided are uniformly controlled in KC emergency operation. Compared to a safety timing retard for all cylinders, the forming of cylinder pairs according to the present invention and the pair-wise control according to the present invention allows earlier ignition angles for at least some of the cylinders of the internal combustion engine, so that a torque gain is able to be achieved.

If a plurality of guide cylinders is assigned to the cylinder pair to be guided, the greatest torque gain may be achieved by ascertaining in each case the minimum of the ignition timing retards of all guide cylinders of the cylinder pair to be guided and this minimum of the ignition timing retards forming the basis for the ignition timing retard of the cylinder pair to be guided.

For reasons of application safety, it is advantageous if the cylinder pair to be guided is operated at the ignition timing retard of the guide cylinder or the minimum of the ignition timing retards of all the assigned guide cylinders plus an applicable offset.

BRIEF DESCRIPTION OF THE DRAWING

The FIGURE shows a switching logic for realizing the method according to the present invention for a four-cylinder engine.

DETAILED DESCRIPTION

Reference numerals 11 and 12 denote the igniting-timing retard signals of two cylinders of a four-cylinder engine which operate at a 360° offset and are combined to form a first cylinder pair in the event of KC emergency operation. The ignition timing retard signals from the other two cylinders of the four-cylinder engine are denoted by reference numerals 21 and 22. These other two cylinders form a second cylinder pair in KC emergency operation.

The case shown here is not limited to KC emergency operation only. In addition, starting with a certain rotational speed, a reliable knock detection is also no longer possible for at least one of the two cylinders of the first cylinder pair. For this reason, the first cylinder pair is designated to be the one to be guided. In the case at hand, upon activated guide-cylinder function, both cylinders of the second cylinder pair are assigned to the first cylinder pair as guide cylinders.

To determine the respective ignition timing retard for the first cylinder pair, the minimum of the ignition timing retard signals 21 and 22 of the second cylinder pair is determined in each case with the aid of a switching element 3. A safety offset 5 is added to this minimum by a summation element 4. The result is supplied to a switch 1 at which ignition timing retard signal 11 of a cylinder of the first cylinder pair is present as well. Furthermore, the result is supplied to a switch 2 at which ignition timing retard signal 12 of the other cylinder of the first cylinder pair is present as well.

If, on the one hand, the condition for KC emergency operation 7 and, on the other hand, the condition for guide-cylinder function 8 as well are present at the respective inputs of a logical AND-linking element 6, switches 1 and 2 are activated, so that, as the ignition timing retard signals 110 and 120 of the cylinders of the cylinder pair to be guided, the minimum of the ignition timing retard signals 21 and 22 of the second cylinder pair is used plus the added-on safety offset 5. This minimum selection has the effect that the latest ignition angle is used for the guided cylinders.

What is claimed is:

1. In a multi-cylinder internal combustion engine having 2n cylinders, at least one of the cylinders, upon activation of a guide-cylinder function, being able to function as a guide cylinder for a cylinder declared to be guided; having a cylinder counter; at least one knock sensor; and having an analyzing device for analyzing a knock-sensor signal of the at least one of the cylinders, a method for controlling a knocking in a knock-control emergency operation occurring when the guide-cylinder function is activated and when a phase detection fails that corresponds to when the analyzing device is unable to determine whether the knock-sensor signal is to be assigned one of to the cylinder corresponding to a cylinder counter reading and to the cylinder operating at a 360° offset, the method comprising:

forming cylinder pairs from the cylinders running in each instance at an offset of 360 degrees;

assigning each twin pair having at least one cylinder to be guided at least one of the available guide cylinders, so that an ignition timing retard of the cylinder pair to be guided is based on the ignition timing retard of the associated guide cylinder; and triggering a safety retard timing only when a number of available guide cylinders is insufficient, the safety retard timing occurring when an ignition angle is set which has been predefined for all the cylinders.

2. The method as recited in claim 1, further comprising:

assigning the guide cylinders to the cylinder pair to be guided, wherein, in each instance, a minimum of the ignition timing retards of all the guide cylinders of the cylinder pair to be guided is determined and the ignition timing retard of the cylinder pair to be guided is based on the minimum.

3. The method as recited in claim 1, wherein:

the cylinder pair to be guided is operated at one of:
the ignition timing retard of the guide cylinder, and
the minimum plus an applicable offset.

* * * * *